United States Patent
Beaty et al.

(10) Patent No.: US 7,125,362 B2
(45) Date of Patent: Oct. 24, 2006

(54) HYBRID POWERTRAIN SYSTEM INCLUDING SMOOTH SHIFTING AUTOMATED TRANSMISSION

(75) Inventors: Kevin D. Beaty, Kalamazoo, MI (US); Richard A. Nellums, Farmington Hills, MI (US)

(73) Assignee: Eaton Corporation, Cleveland, OH (US)

( * ) Notice: Subject to any disclaimer, the term of this patent is extended or adjusted under 35 U.S.C. 154(b) by 47 days.

(21) Appl. No.: 10/763,445

(22) Filed: Jan. 23, 2004

(65) Prior Publication Data

US 2005/0164827 A1    Jul. 28, 2005

(51) Int. Cl.
*B60K 1/02* (2006.01)
*F16H 3/08* (2006.01)

(52) U.S. Cl. ............................................. 477/3; 74/329
(58) Field of Classification Search ................. 477/3, 477/109; 475/5; 74/329, 331; 903/913, 903/917, 942, 945
See application file for complete search history.

(56) References Cited

U.S. PATENT DOCUMENTS

| | | | |
|---|---|---|---|
| 4,242,922 A | | 1/1981 | Baudoin |
| 5,337,848 A | * | 8/1994 | Bader ........................ 180/65.2 |
| 5,558,595 A | | 9/1996 | Schmidt et al. |
| 5,931,757 A | * | 8/1999 | Schmidt ........................ 475/2 |
| 6,135,913 A | | 10/2000 | Lyon |
| 6,159,127 A | * | 12/2000 | Loeffler et al. ................. 477/5 |
| 6,371,878 B1 | | 4/2002 | Bowen |
| 6,380,640 B1 | | 4/2002 | Kanamori et al. |
| 6,558,283 B1 | * | 5/2003 | Schnelle ........................ 475/5 |
| 6,740,002 B1 | * | 5/2004 | Stridsberg ..................... 477/14 |
| 6,976,934 B1 | * | 12/2005 | Komeda et al. ................ 477/5 |
| 2002/0061803 A1 | * | 5/2002 | Aoki ............................ 477/3 |
| 2002/0088291 A1 | * | 7/2002 | Bowen ........................ 74/339 |
| 2002/0189397 A1 | * | 12/2002 | Sakamoto et al. ............ 74/661 |
| 2003/0160455 A1 | * | 8/2003 | Hu et al. .................. 290/40 C |

FOREIGN PATENT DOCUMENTS

| | | |
|---|---|---|
| DE | 37 00 380 A1 | 8/1987 |
| EP | 0 953 467 A2 | 11/1999 |
| EP | 1122109 A2 * | 8/2001 |
| EP | 1 302 697 A2 | 4/2003 |
| WO | WO-99/21263 | 4/1999 |

OTHER PUBLICATIONS

International Search Report dated Jun. 21, 2005 (3 pages).
Derwent English Abstract for DE 37 00 380 A1 (1 page).

* cited by examiner

*Primary Examiner*—Roger Pang
(74) *Attorney, Agent, or Firm*—Rader, Fishman & Grauer PLLC (57) ABSTRACT

A powertrain system is provided that includes a prime mover and a change-gear transmission having an input, at least two gear ratios, and an output. The powertrain system also includes a power shunt configured to route power applied to the transmission by one of the input and the output to the other one of the input and the output. A transmission system and a method for facilitating shifting of a transmission system are also provided.

47 Claims, 4 Drawing Sheets

HYBRID POWERTRAIN SYSTEM INCLUDING SMOOTH SHIFTING AUTOMATED TRANSMISSION

The present invention relates to a powertrain system and, more particularly, to a hybrid powertrain system including an automated transmission. This invention was made with Government support under NREL Subcontract No. ZCL-2-32060-01, Prime Contract DE-AC36-99GO10337 awarded by the Department of Energy. The government has certain rights in this invention.

BACKGROUND OF THE INVENTION

1. Field of the Invention
2. Description of the Related Art

Automated mechanical transmission systems not requiring a vehicle driver to operate a vehicle master clutch (so called "two-pedal systems"), are known in the art. When the master clutch is engaged and rotational torque is being transmitted from the vehicle engine to the transmission, there generally is a large torque load or "torque lock" holding the transmission gear engaging device in a particular position. This torque load makes it quite difficult, if not impossible, to shift the transmission to neutral or change gears without somehow significantly reducing the torque load. One way to relieve torque load is to disengage the master clutch; which breaks the coupling between the input member and the output member. Disengaging the master clutch permits the torque load to go to zero and allows the operator or automated transmission system to shift into neutral or change gears. However, shifting the transmission with the master clutch remaining engaged is preferred in many situations, as such shifts tend to be of a higher shift quality and/or cause less wear on the powertrain.

For these and other reasons, it is desirable to provide an improved system and method of facilitating a gear ratio change in an automated transmission.

SUMMARY OF THE INVENTION

A powertrain system is provided that includes a prime mover and a change-gear transmission having an input, at least two gear ratios, and an output. The powertrain system also includes a power shunt configured to route power applied to the transmission by one of the input and the output to the other one of the input and the output. A transmission system and a method for facilitating shifting of a transmission system are also provided.

BRIEF DESCRIPTION OF THE DRAWINGS

Embodiments of the invention will now be described, by way of example, with reference to the accompanying drawings, wherein.

DETAILED DESCRIPTION OF THE INVENTION

Figure 1:
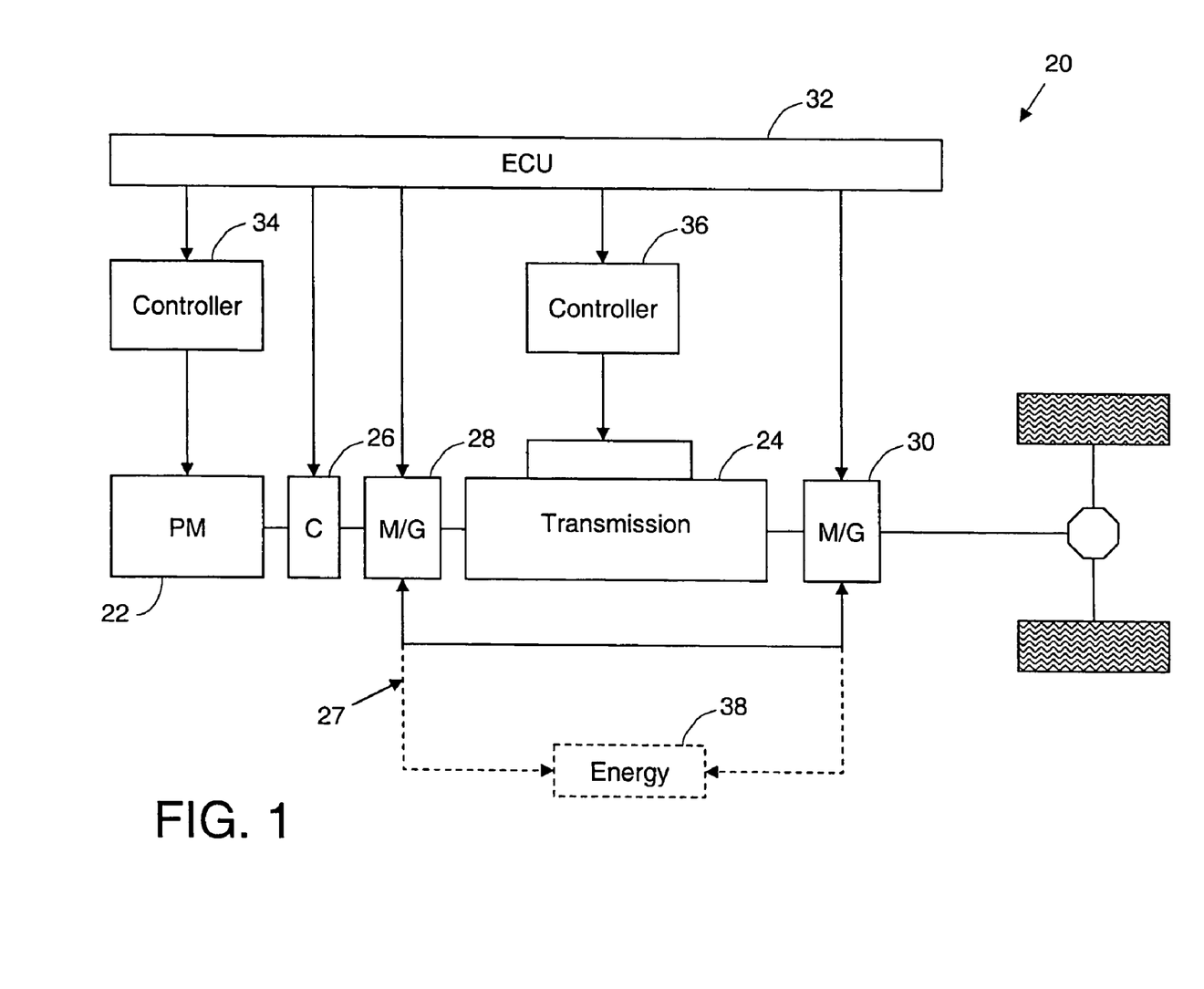
FIG. 1 is a block diagram showing a vehicle powertrain system according to an embodiment of the present invention.

FIG. 1 is a block diagram showing a powertrain system 20 according to an embodiment of the present invention. In the illustrated embodiment, powertrain system 20 includes a prime mover 22, such as a spark-ignited or compression-ignited internal combustion engine, a change-gear transmission 24 and a master clutch 26. Powertrain system 20 also includes a power shunt 27 that includes a first motor-generator 28 and a second motor-generator 30. The term motor-generator is used to describe devices that generate a rotational output based on a power input and/or generate a power output based on a rotational input. Such motor-generator devices include, without limitation, electric motor-generators and hydraulic motor-pumps.

In an embodiment, powertrain system 20 also includes an electronic control unit (ECU) 32 for controlling operation of prime mover 22, transmission 24 and motor-generators 28, 30. In an implementation of the invention, ECU 32 includes a programmable digital computer configured to receive various input signals, including without limitation, the operating speed of prime mover 22, transmission input speed, selected gear ratio, transmission output speed and vehicle speed. ECU 32 processes these signals accordingly to logic rules to control operation of powertrain system 20. To support this control, each of prime mover 22 and transmission 24 may optionally include its own controller (34 and 36, respectively), which is controlled by ECU 32. However, the present invention is not limited to any particular type or configuration of ECU 32 and controllers 34 and 36, or to any specific control logic for governing operation of powertrain system 20. For example, ECU 32 may perform the functions of controller 34 or 36.

As will be discussed in further detail below, powertrain system 20 may also include at least one energy storage device 38 for providing energy to operate first and second motor-generators 28, 30. For example, energy storage device 38 may include a hydraulic accumulator when first and second motor-generators 28, 30 function as hydraulic motor-pumps. When so configured, each hydraulic motor-generator 28, 30 may be provided in communication with energy storage device 38 through a hydraulic controller 39 (see, e.g., FIG. 5), as is known in the art. Alternatively, energy storage device 38 may include a battery, a bank of batteries or a capacitor when first and second motor-generators 28, 30 function as an electric motor-generator. When so configured, each electric motor-generator 28, 30 may be provided in electrical communication with energy storage device 38 through a drive inverter 40 (see, e.g., FIG. 4), as is known in the art.

Figure 2:
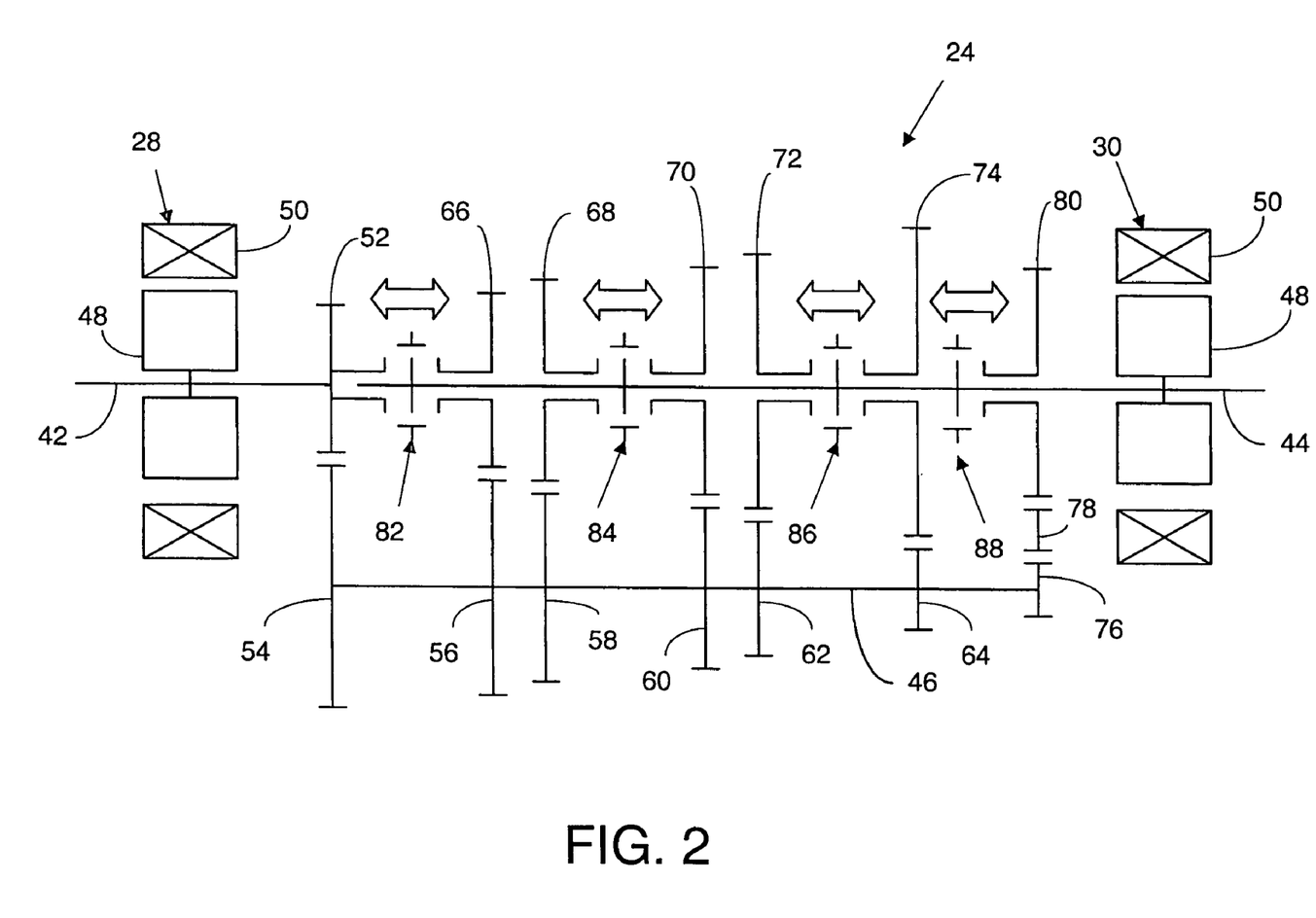
FIG. 2 is a schematic diagram showing a transmission arrangement according to an embodiment of the invention.

Referring to FIG. 2, an embodiment of transmission 24 is shown. In the illustrated embodiment, transmission 24 includes an input shaft 42, a main or output shaft 44, a countershaft 46 that extends generally parallel to input and output shafts 42 and 44, and one or more gears arranged on and/or around shafts 42, 44 and 46. In a particular configuration, first motor-generator 28 is connected to input shaft 42 and second motor-generator 30 is connected to output shaft 44. When first and second motor-generators 28, 30 function as electric motor-generators, as illustrated in FIG. 2, input and output shafts 42, 44 are connected for rotation with a rotor 48 that is positioned within a stator 50. Each rotor 48 may be splined to its corresponding shaft 42, 44 for rotation therewith; however, other configurations known in the art may also be used to connect rotors 48 with shafts 42, 44. While first and second motor-generators 28, 30 are shown in FIG. 2 as comprising electric motor-generators, they are not necessarily limited thereto. Moreover, while transmission is shown and described as a layshaft configuration, other configurations, including planetary gearing configurations, are also with the scope of the invention.

Input shaft 42 is connectable to prime mover 22 through clutch 26 (not shown in FIG. 2). In an embodiment of the invention, clutch 26 is an automated master clutch. Thus, engagement and disengagement of clutch 26 functions automatically without actuation of a pedal or other input by the vehicle driver. However, other clutch designs in which engagement and disengagement of the clutch is governed by the vehicle driver, are also within the scope of the invention.

To input shaft 42 there is connected a first headset gear 52 that meshes with a second headset gear 54 connected to countershaft 46. Countershaft 46 carries a number of input gears 56, 58, 60, 62 and 64 that are affixed to and, therefore, rotate with countershaft 46. The number of input gears provided on countershaft 46 is not limited to the number shown in FIG. 2, and may include more or less input gears depending on the number of ratios desired in transmission 24. The term "gear" is used to define the toothed wheels illustrated in FIG. 2, as well as manufacture of the toothed features of the wheels directly into input and output shafts 42, 44 and countershaft 46.

To output shaft 44 there are rotatably supported a number of output gears 66, 68, 70, 72 and 74. Unlike input gears 56–64 on countershaft 46, output gears 66–74 are free to rotate around output shaft 44. Input gears 56–64 are each meshed with a corresponding output gear 66–74 to create a number of gear ratios in transmission 24. As with input gears 56–64, the number of output gears 66–74 provided on output shaft 44 is not limited to the number shown in FIG. 2.

To countershaft 46 there is also connected a reverse input gear 76 that rotates together with countershaft 46. Reverse input gear 76 is meshed with an idler gear 78 that, in turn, is meshed with a reverse output gear 80 rotatably supported on output shaft 44. The idler gear 78 changes the direction of rotation of output gear 80, which causes the vehicle to move in the reverse direction when engaged to output shaft 44, whereas the other output gears 66–74 cause the vehicle to move in the forward direction when engaged to output shaft 44.

In the embodiment illustrated in FIG. 2, transmission 24 also includes axially moveable clutches 82, 84, 86 and 88, such as non-synchronized single or double acting dog-type clutches, which are splined to output shaft 44 for rotation therewith. In an embodiment, clutch 82 is moveable in an axial direction toward first motor-generator 28 to fix output shaft 44 for rotation with input shaft 42 (through headset gear 52) or in an opposite direction to fix output gear 66 for rotation with output shaft 44. Similarly, clutches 84–88 may be moved in opposite axial directions to rotationally fix their corresponding output gear(s) to output shaft 44.

As described above, ECU 32 delivers commands to the components of powertrain system 20 based on the receipt and evaluation of various input signals. These commands may include gear ratio selection commands to a shift control device (not shown) that indirectly moves clutches 82, 84, 86 and 88 to establish the gear ratios between countershaft 46 and output shaft 44. The shift control device may be a conventional device, such as, for example, an X-Y electromechanical shift actuator system or any other suitable device that controls the axial position of each of clutches 82, 84, 86 and 88 through a rail-type shift control mechanism (none shown). Alternatively, clutches 82, 84, 86 and 88 may be hydraulically and/or electromechanically operated without the use of a rail-type shift control mechanism.

Figure 3:
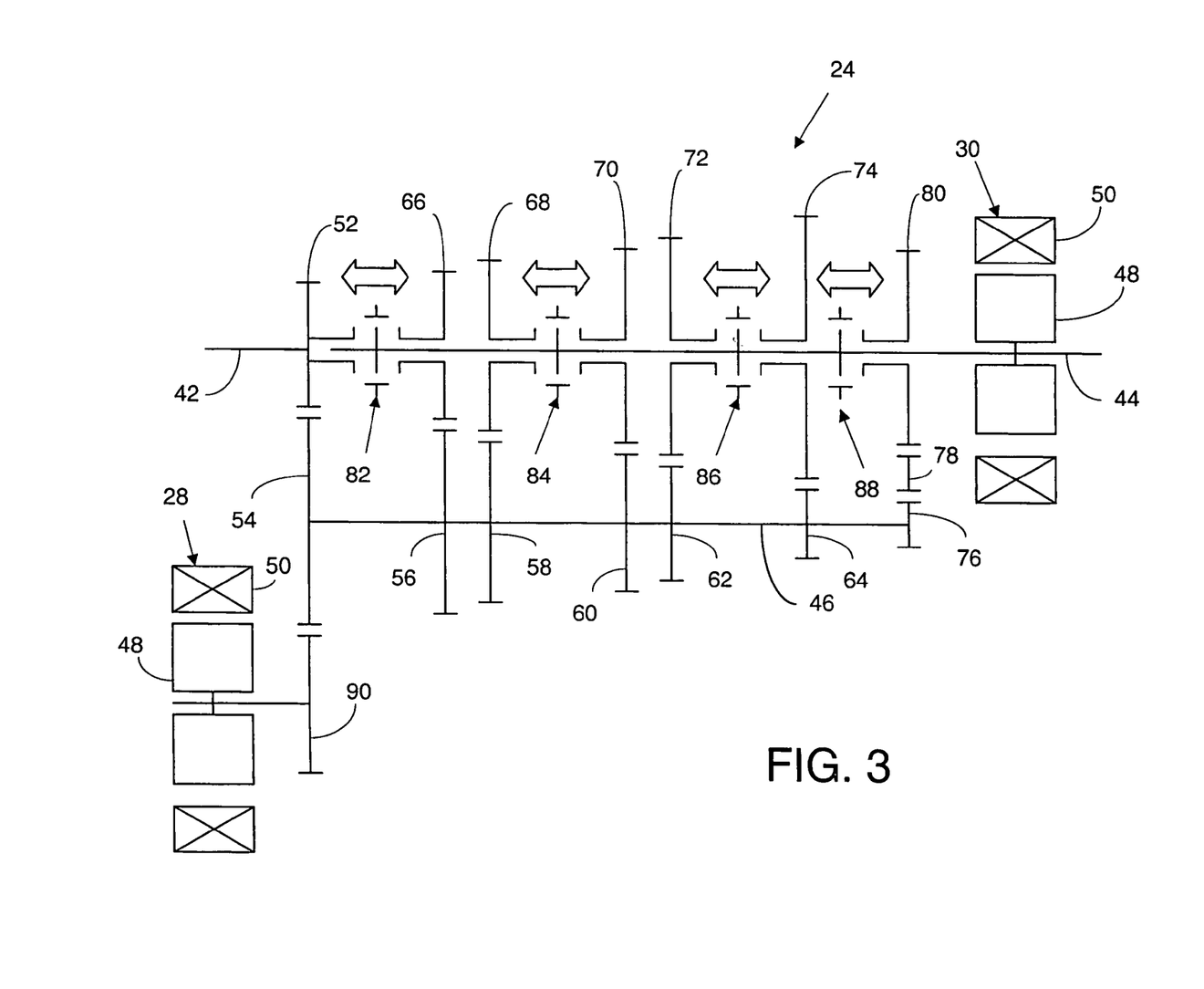
FIG. 3 is a schematic diagram showing a transmission arrangement according to another embodiment of the invention.

Referring to FIG. 3, another embodiment of transmission 24 is shown. In this embodiment, first motor-generator 28 is connected to the input of transmission 24 through a power takeoff (PTO) of transmission 24. In a representative configuration shown in FIG. 3, first motor-generator 28 is connected to a power takeoff gear 90, which is meshed with second headset gear 54 on countershaft 46. Alternatively, first motor-generator 28 may be connected with a gear or other device (not shown) on the upstream side of clutch 26. For example, motor-generator 28 may be connected to prime mover 22 by an engine accessory drive belt, such as is used for an alternator or a power steering pump.

Operation of powertrain system 20 will now be described with reference to FIGS. 1–3. In a first mode of operation, power is transmitted from input shaft 42 into countershaft 46 and then into output shaft 44 through cooperating input/output gears (e.g., gears 64 and 74). As noted above, a gear ratio is selected by operating one of clutches 82, 84, 86 and 88 to fix rotation of an output gear (e. g., gear 74) with output shaft 44.

When master clutch 26 is engaged and power is being transmitted from prime mover 22 through transmission 24 to output shaft 44, there generally is a large torque load or "torque lock" holding the engaged clutch in a particular position. During a gear ratio change or "shift event", the power applied to output gears 66–74 must approach a zero value, so that the clutch (e.g., clutch 86) engaged to the selected output gear (e.g., gear 74) may be disengaged and a new output gear can be engaged. For optimum operation of powertrain system 20, there is also a desire to continuously apply power from prime mover 22 through the transmission 24 to output shaft 44. To meet both of these operating objectives during a shift event, first motor-generator 28 may be operated as a generator to absorb power from prime mover 22, and second motor-generator 30 may be operated as a motor to apply power to output shaft 44. This operation maintains power on output shaft 44, and reduces the power applied through transmission 24 toward a zero value, which overcomes the "torque lock" imposed on the engaged output shaft clutch by the selected output gear. Once the power transmitted between the selected output gear (e.g., gear 74) and the engaging clutch (e.g., clutch 86) significantly decreases or falls to zero, the engaging clutch may be disengaged and a different gear ratio may then be selected when appropriate.

In a motor vehicle application, driveline torque may be transmitted from prime mover 22 through input shaft 42, into transmission 24, and then through output shaft 44 to the drive wheels. In this manner, the driveline torque is considered positive. Alternatively, driveline torque may be transmitted from the drive wheels of the vehicle, through output shaft 44 into transmission 24, and then through input shaft 42 to prime mover 22, such as when the vehicle is slowing to a stop. In this manner, the driveline torque is considered negative. When the driveline torque is negative, second motor-generator 30 may be operated as a generator to absorb the power from output shaft 44, and first motor-generator 28 may be operated as a motor to drive the prime mover through input shaft 42, to maintain power from output shaft 44 to input shaft 42, and relieve torque on the selected output gear (e.g. gear 74) to overcome any "torque lock" imposed on the selected output gear (e.g. gear 74) by the engaged output shaft clutch (e.g. clutch 86). The engaged output shaft clutch (e.g., clutch 86) may then be disengaged and a different gear ratio may then be selected when appropriate.

In an embodiment of the invention, the power to operate second motor-generator 30 as a motor during a shift event is provided by first motor-generator 28 operating as a generator. Particularly, first motor-generator 28 is used in the generator mode to absorb power from prime mover 22 at input shaft 42, while the power accepted by first motor-generator 28 is shunted to second motor-generator 30 to apply torque to output shaft 44. An up-shift gear change may be accomplished in this manner by operating first and second motor-generators 28, 30 to adjust the speeds of input shaft 42 and output shaft 44 to the appropriate values for the new gear ratio, while continuing to absorb power from prime mover 22 and apply power to output shaft 44. More particularly, the speeds of input shaft 42 and/or output shaft 44 may be adjusted to modify the speed of output gears 66–74 and/or clutches 82, 84, 86 and 88 such that the rotational speed of a ratio gear is substantially similar to the rotational speed of an engaging clutch during a gear ratio change.

Alternatively, the power to operate first motor-generator 28 as a motor during a period of negative driveline torque is provided by second motor-generator 30 operating as a generator. Particularly, second motor-generator 30 is used in the generator mode to absorb power at output shaft 44 and shunt this power to first motor-generator 28 for application to input shaft 42. By shunting power between the input and the output of transmission 24, and appropriately controlling torques and speeds during a shift event, the speed of an up-shift or downshift event can be significantly increased and transmission 24 can be "power shifted" without interruption of power between input shaft 42 and output shaft 44.

Figure 4:
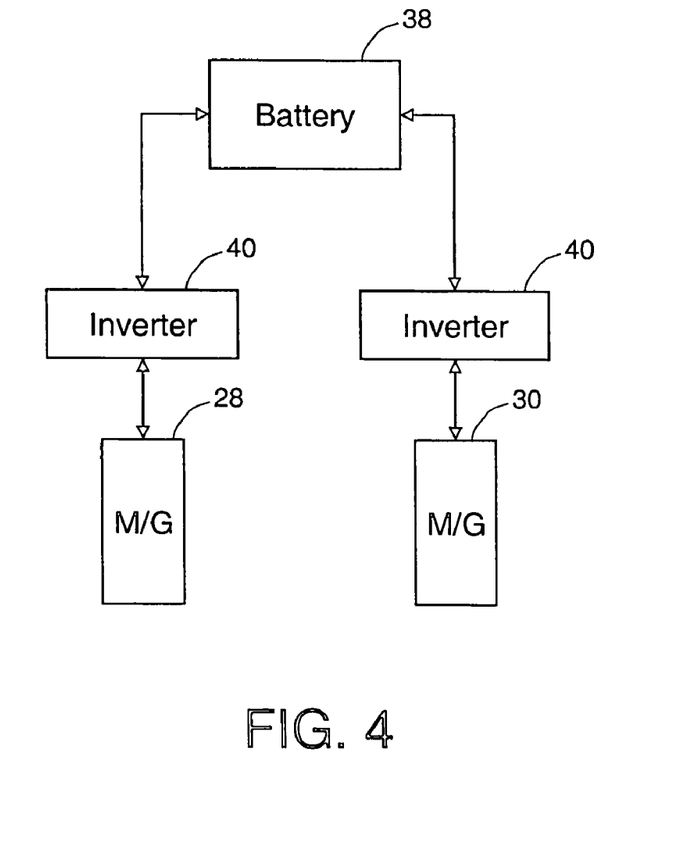
FIG. 4 is a block diagram showing an electric power shunt for use in the transmission arrangements of FIGS. 2 and 3.
Figure 5:
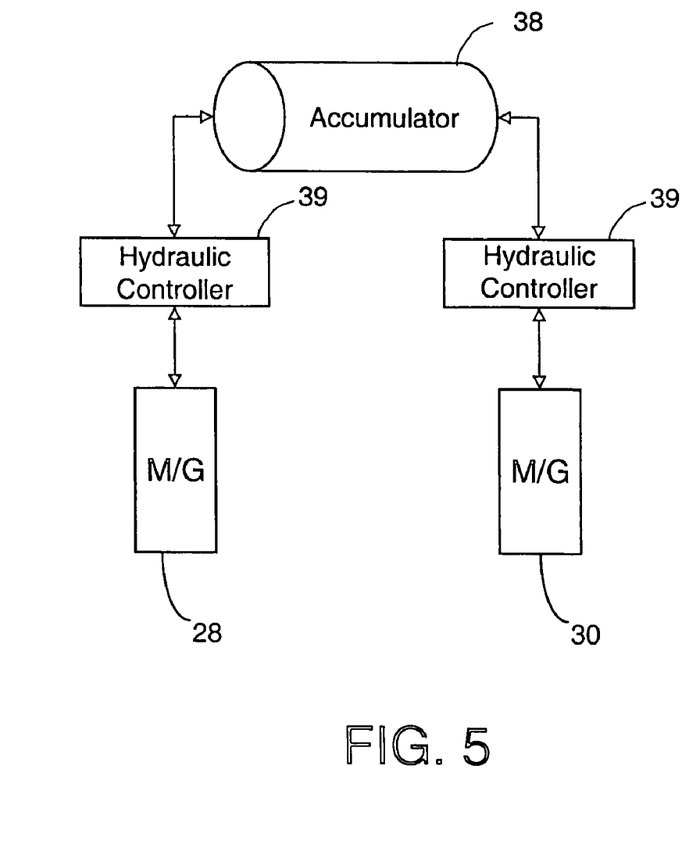
FIG. 5 is a block diagram showing a hydraulic power shunt for use in the transmission arrangements of FIGS. 2 and 3.

Referring to FIGS. 1, 4 and 5, the flow of power between first and second motor-generators 28, 30 during a shift event may be direct, as shown in FIG. 1, or indirect, as shown in FIGS. 1, 4 and 5. As shown in FIG. 4, when first and second motor-generators function as electric motor-generators, the electric power generated by first and second motor-generators 28, 30 may be routed through a drive inverter 40 and stored in energy storage device 38 prior to distribution to the motor-generator requiring power. As shown in FIG. 5, when first and second motor-generators function as hydraulic motor-pumps, the hydraulic power generated by first and second motor-generators 28, 30 may be routed through hydraulic controller 39 and stored in energy storage device 38 prior to distribution to the motor-generator requiring power. Operation of each motor-generator 28, 30 as a generator may occur during a shift event or at any time during operation of powertrain 20 where operation of motor-generators 28, 30 as a generator does not adversely impact operation of powertrain system 20.

In an embodiment of the invention, the power shunted between first and second motor-generators 28, 30 may be diminished by storing a portion of the shunted power in energy storage device 38 or augmented by applying stored energy to the power stream between first and second motor-generators 28, 30. In another embodiment, powertrain system 20 may include a single motor-generator 30 connected to output shaft 44. In this embodiment, motor-generator 30 may be operated as a generator to charge energy storage device 38 when convenient, such as between shift events and during vehicle cruise. During periods of positive driveline torque, motor-generator 30 uses the stored energy for operation as a motor to maintain power on the output shaft 44 during a shift event. Alternatively, during periods of negative driveline torque, motor-generator 30 is operated as a generator to charge energy storage device 38. When no input shaft motor-generator is employed, the torque and speed on transmission input shaft 42 is controlled in some other manner, such as by controlled operation of prime mover 22 with clutch 26 engaged.

During periods of positive driveline torque, the power shunted between first and second motor-generators 28, 30 is the power produced by prime mover 22. The capacity of first and second motor-generators 28, 30 may be reduced by limiting the amount of power produced by prime mover 22 during periods of positive driveline torque when power is shunted from first motor-generator 28 to second motor-generator 30. For example, ECU 32 may reduce fueling of prime mover 22 operating as an engine when power is shunted from first motor-generator 28 to second motor-generator 30.

In transmission systems that disengage the master clutch during a shift event, the torque applied to the output shaft of the transmission significantly decreases or falls to zero during a gear ratio change. In a motor vehicle, this interruption of torque is perceived by the vehicle occupants. However, when powertrain system 20 is employed in a motor vehicle, second motor-generator 30 may be operated to maintain torque on output shaft 44 through to the drive wheels of a vehicle employing powertrain system 20 when a gear ratio change is requested. This feature improves the shift smoothness and shift quality of powertrain system 20 in addition to enabling automated "power-shifting" of transmission 24.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A powertrain system, comprising:
   a prime mover;
   a change-gear transmission including an input, at least two selectable gear ratios, and an output, wherein at least the prime mover selectively applies power to the transmission; and
   a power shunt including a first motor-generator and a second motor-generator, that selectively shunts at least a portion of the power applied to the transmission by one of the input and the output to the other one of the input and the output, wherein the first motor-generator selectively generates a power output from a rotational input, the second motor-generator selectively generates a rotational output from a power input, and wherein the ratio gears are engaged by a clutch and the power shunt is configured to route power applied to the transmission by one of the input and the output to the other one of the input and the output such that the rotational speed of a ratio gear is substantially similar to the rotational speed of an engaging clutch during a gear ratio change, wherein the first motor-generator is a generator and the second motor generator is a motor when driveline torque is positive.

2. The powertrain system of claim 1, wherein the first motor-generator is connected to the input and the second motor-generator is connected to the output.

3. The powertrain system of claim 1, wherein the first motor-generator is driven by the prime mover.

4. The powertrain system of claim 1, wherein the first and second motor-generators are electric motor-generators.

5. The powertrain system of claim 1, wherein the first motor-generator is a motor and the second motor-generator is a generator when driveline torque is negative.

6. The powertrain system of claim 1, wherein the power shunt includes electric power generated by one of the first and second motor-generators.

7. The powertrain system of claim 1, wherein the input is an input shaft and the output is an output shaft.

8. The powertrain system of claim 1, wherein the power shunt includes an energy storage device.

9. The powertrain system of claim 8, wherein the energy storage device stores electric power or fluid power.

10. The powertrain system of claim 1, wherein the power shunt is configured to route power applied to the transmission by one of the input and the output to the other one of the input and the output such that power transmitted between a selected ratio gear and an engaging clutch significantly decreases or falls to zero.

11. The powertrain system of claim 1, wherein the selection of a gear ratio is accomplished by engaging at least a portion of a clutch to at least a portion of a gear.

12. The powertrain system of claim 1, wherein the power shunt selectively shunts no power produced by the prime mover from the input to the output, and about all power produced by the prime mover is selectively transmitted through the gear ratios.

13. A powertrain system, comprising:
a prime mover;
a change-gear transmission tat includes an input, at least two gear ratios and an output;
a first motor-generator connected to the input and a second motor-generator connected to the output,
a first power path between the input and the output of the transmission, the first power path defined by the gear ratios of the transmission; and
a second power path between the input and the output of the transmission, the second power path including a transfer of power from a rotational input to a non-rotational power transfer medium in one of the first motor-generator and the second motor-generator, and a transfer of power from the non-rotational power transfer medium to a rotational output in the other one of the first motor-generator and the second motor-generator, wherein the first motor-generator is a motor and the second motor-generator is a generator when driveline torque is negative.

14. The powertrain system of claim 13, wherein first and second motor-generators are configured to route power through the second power pat such that the power applied to the input is substantially similar to the power applied to the output during a gear change event.

15. The powertrain system of claim 13, wherein the first motor-generator is a generator and the second motor-generator is a motor when driveline torque is positive.

16. The powertrain system of claim 13, wherein the second power path includes electric power generated by one of the first and second motor-generators.

17. The powertrain system of claim 13, wherein the first and second motor-generators are either a motor or a generator.

18. The powertrain system of claim 13, wherein the input is an input shaft and the output is an output shaft.

19. The powertrain system of claim 13, wherein the second power path includes an energy storage device.

20. The powertrain system of claim 19, wherein the energy storage device stores electric power or fluid power.

21. The powertrain system of claim 13, wherein the ratio gears are engaged by a clutch and a power shunt is configured to route power applied to the transmission by one of the input and the output to the other one of the input and the output such that power transmitted between a selected ratio gear and an engaging clutch significantly decreases or falls to zero.

22. The powertrain system of claim 13, wherein the ratio gears are engaged by a clutch and a power shunt is configured to route power through the second power path such that the rotational speed of a ratio gear is substantially similar to the rotational speed of an engaging clutch during a gear ratio change.

23. The powertrain system of claim 13, wherein all power produced by the prime mover selectively flows through the second power path while no power flows through the first power path.

24. The powertrain system of claim 13, wherein the first motor generator generates an electrical current from the rotation of the input, at least a portion of the electrical current is routed to the second motor generator, and the second motor generator receives the at least a portion of the electrical current and causes rotation of the output.

25. A transmission system, comprising:
a change-gear transmission including an input, at least two gear ratios, and an output; and
a power shunt including a first motor-generator and a second motor-generator, that selectively shunts at least a portion of the power applied to the transmission by one of the input and the output to the other one of the input and the output, wherein the first motor-generator selectively generates a power output from a rotational input, the second motor-generator selectively generates a rotational output from a power input, and wherein the ratio gears are engaged by a clutch and the power shunt is configured to route power applied to the transmission by one of the input and the output to the other one of the input and the output such that power transmitted between a selected ratio gear and an engaging clutch significantly decreases or falls to zero, wherein the first motor-generator is a motor and the second motor-generator is a generator when driveline torque is negative.

26. The transmission system of claim 25, wherein the first motor-generator is connected to the input and the second motor-generator is connected to the output.

27. The transmission system of claim 25, wherein the first and second motor-generators are electric motor-generators.

28. The transmission system of claim 25, wherein the first motor-generator is a generator and the second motor-generator is a motor when driveline torque is positive.

29. The transmission system of claim 25, wherein the power shunt includes electric power generated by one of the first and second motor-generators.

30. The transmission system of claim 25, wherein the input is an input shaft and the output is an output shaft.

31. The transmission system of claim 25, wherein the power shunt includes an energy storage device.

32. The transmission system of claim 31, wherein the energy storage device stores electric power or fluid power.

33. The transmission system of claim 25, wherein and the power shunt is configured to route power applied to the transmission by one of the input and the output to the other one of the input and the output such that the rotational speed of a ratio gear is substantially similar to the rotational speed of an engaging clutch during a gear ratio change.

34. The transmission system of claim 25, wherein the selection of a gear ratio is accomplished by engaging at least a portion of a clutch to at least a portion of a gear.

35. The transmission system of claim 25, wherein the power shunt selectively shunts all power produced by a prime mover from the input to the output such that no power is transmitted through the gear ratios.

36. The transmission system of claim 25, wherein the power shunt selectively shunts no power produced by a prime mover from the input to the output, and about all power produced by the prime mover is transmitted through the gear ratios.

37. A powertrain system, comprising:
a prime mover;
a change-gear transmission including an input, at least two selectable gear ratios, and an output, wherein at least the prime mover selectively applies power to the transmission; and
a power shunt including a first motor-generator and a second motor-generator, that selectively shunts at least a portion of the power applied to the transmission by one of the input and the output to the other one of the input and the output, wherein the first motor-generator selectively generates a power output from a rotational input, the second motor-generator selectively generates a rotational output from a power input, and wherein the ratio gears are engaged by a clutch and the power shunt is configured to route power applied to the transmission by one of the input and the output to the other one of the input and the output such that the rotational speed of a ratio gear is substantially similar to the rotational speed of an engaging clutch during a gear ratio change, wherein the power shunt selectively shunts all power produced by the prime mover from the input to the output such that no power is transmitted through the gear ratios.

38. A powertrain system, comprising:
a prime mover;
a change-gear transmission including an input, at least two selectable gear ratios, and an output, wherein at least the prime mover selectively applies power to the transmission; and
a power shunt including a first motor-generator and a second motor-generator, that selectively shunts at least a portion of the power applied to the transmission by one of the input and the output to the other one of the input and the output, wherein the first motor-generator selectively generates a power output from a rotational input, the second motor-generator selectively generates a rotational output from a power input, wherein the ratio gears are engaged by a clutch and the power shunt is configured to route power applied to the transmission by one of the input and the output to the other one of the input and the output such that the rotational speed of a ratio gear is substantially similar to the rotational speed of an engaging clutch during a gear ratio change, and wherein the first motor-generator is a motor and the second motor-generator is a generator when driveline torque is negative.

39. A powertrain system, comprising:
a prime mover;
a change-gear transmission that includes an input, at least two gear ratios and an output;
a first motor-generator connected to the input and a second motor-generator connected to the output,
a first power path between the input and the output of the transmission, the first power path defined by the gear ratios of the transmission; and
a second power path between the input and the output of the transmission, the second power path including a transfer of power from a rotational input to a non-rotational power transfer medium in one of the first motor-generator and the second motor-generator, and a transfer of power from the non-rotational power transfer medium to a rotational output in one of the first motor-generator and the second motor-generator wherein the ratio gears are engaged by a clutch and a power shunt is configured to route power through the second power pat such that the rotational speed of a ratio gear is substantially similar to the rotational speed of an engaging clutch during a gear ratio change.

40. The powertrain system of claim 39, wherein first and second motor-generators are configured to route power through the second power path such that the power applied to the input is substantially similar to the power applied to the output during a gear change event.

41. The powertrain system of claim 39, wherein the first motor-generator is a generator and the second motor-generator is a motor when driveline torque is positive.

42. The powertrain system of claim 39, wherein the second power path includes electric power generated by one of the first and second motor-generators.

43. The powertrain system of claim 39, wherein the first and second motor-generators are either a motor or a generator.

44. The powertrain system of claim 39, wherein the input is an input shaft and the output is an output shaft.

45. The powertrain system of claim 39, wherein the second power path includes an energy storage device.

46. The powertrain system of claim 39, wherein the energy storage device stores electric power or fluid power.

47. The powertrain system of claim 39, wherein the ratio gears are engaged by a clutch and a power shunt is configured to route power applied to the transmission by one of the input and the output to the other one of the input and the output such that power transmitted between a selected ratio gear and an engaging clutch significantly decreases or falls to zero.

* * * * *

UNITED STATES PATENT AND TRADEMARK OFFICE
CERTIFICATE OF CORRECTION

| | | |
|---|---|---|
| PATENT NO. | : 7,125,362 B2 | Page 1 of 1 |
| APPLICATION NO. | : 10/763445 | |
| DATED | : October 24, 2006 | |
| INVENTOR(S) | : Kevin D. Beaty et al. | |

It is certified that error appears in the above-identified patent and that said Letters Patent is hereby corrected as shown below:

Col. 7 in Claim 13, line 3, "tat" should be --that--.

Col. 7 in Claim 14, line 3, "pat" should be --path--.

Signed and Sealed this

Twenty-seventh Day of February, 2007

JON W. DUDAS
*Director of the United States Patent and Trademark Office*